US008426480B2

(12) United States Patent
Ji et al.

(10) Patent No.: US 8,426,480 B2
(45) Date of Patent: *Apr. 23, 2013

(54) PLASTIC RECLAIMED FROM INFECTIOUS MEDICAL WASTE AND MEDICAL DEVICES MANUFACTURED THEREFROM

(75) Inventors: Richard Ji, Temecula, CA (US); Kenneth McCord, Encinitas, CA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/883,840

(22) Filed: Sep. 16, 2010

(65) Prior Publication Data

US 2011/0068036 A1    Mar. 24, 2011

Related U.S. Application Data

(63) Continuation-in-part of application No. 12/562,355, filed on Sep. 18, 2009.

(51) Int. Cl.
    *C08J 11/04* (2006.01)

(52) U.S. Cl.
    USPC ......... 521/40; 241/15; 241/24.18; 241/24.28; 241/606; 241/DIG. 38; 528/480; 528/499; 528/502 R; 528/502 F; 528/503; 422/26; 422/292; 422/295; 422/298; 422/307; 422/309

(58) Field of Classification Search ............... 521/40, 521/40.5, 41, 45, 45.5, 46, 46.5, 47, 48, 49, 521/49.8; 422/26, 27, 28, 31, 292, 295, 298, 422/299, 305, 307, 309; 528/480, 481, 499, 528/500, 502 R, 502 A, 502 C, 502 F, 503; 241/14, 15, 18, 24.18, 24.22, 24.25, 24.28, 241/606, DIG. 38
    See application file for complete search history.

(56) References Cited

U.S. PATENT DOCUMENTS

| | | |
|---|---|---|
| 5,075,057 A | 12/1991 | Hoedl |
| 5,271,500 A | 12/1993 | Szacon |
| 5,277,869 A | 1/1994 | Glazer et al. |
| 5,350,562 A | 9/1994 | Anthony |
| 5,395,681 A | 3/1995 | Hargarter et al. |
| 5,427,737 A | 6/1995 | Glazer et al. |
| 5,462,794 A | 10/1995 | Lindemann et al. |
| 5,508,004 A | 4/1996 | Held et al. |
| 5,557,905 A | 9/1996 | Harding |
| 5,558,280 A | 9/1996 | Morgan |
| 5,582,793 A | 12/1996 | Glazer et al. |
| 5,693,278 A | 12/1997 | Clements |
| 5,785,260 A | 7/1998 | Morgan |
| 5,824,745 A | 10/1998 | Brown |
| 5,830,396 A | 11/1998 | Higgins et al. |
| 5,830,419 A | 11/1998 | Held et al. |
| 5,833,922 A | 11/1998 | Held et al. |
| 5,876,644 A * | 3/1999 | Nichols et al. ............ 264/101 |
| 6,053,314 A | 4/2000 | Pittman |
| 6,348,272 B1 | 2/2002 | Haveaux et al. |
| 6,509,537 B1 * | 1/2003 | Krieg et al. ............ 209/579 |
| 6,712,207 B2 | 3/2004 | Panek, Jr. et al. |
| 6,792,662 B2 | 9/2004 | Samuel |
| 6,808,820 B2 | 10/2004 | Lee et al. |
| 6,881,493 B2 | 4/2005 | Haveaux et al. |
| 7,243,792 B2 | 7/2007 | Panek, Jr. et al. |
| 7,531,226 B2 | 5/2009 | Lee et al. |
| 7,596,844 B2 | 10/2009 | Japuntich et al. |
| 7,600,639 B2 | 10/2009 | Japuntich et al. |
| 7,877,849 B2 | 2/2011 | Panek, Jr. et al. |
| 2003/0038046 A1 | 2/2003 | Panek, Jr. et al. |
| 2003/0170157 A1 | 9/2003 | Aubert |
| 2003/0213714 A1 | 11/2003 | Moats et al. |
| 2004/0099555 A1 | 5/2004 | Panek, Jr. et al. |
| 2005/0121343 A1 | 6/2005 | Miller et al. |
| 2005/0127579 A1 | 6/2005 | Suzuki |
| 2005/0218142 A1 | 10/2005 | Finnestad et al. |
| 2005/0228682 A1 | 10/2005 | Firestone, III |
| 2007/0068832 A1 | 3/2007 | Anderson et al. |
| 2007/0068834 A1 | 3/2007 | Smudde et al. |
| 2007/0069490 A1 | 3/2007 | Japuntich et al. |
| 2008/0058736 A1 | 3/2008 | Reshamawala |
| 2008/0067093 A1 | 3/2008 | Japuntich et al. |
| 2008/0067094 A1 | 3/2008 | Japuntich et al. |
| 2008/0067100 A1 | 3/2008 | Japuntich et al. |
| 2008/0073231 A1 | 3/2008 | Clayton et al. |
| 2008/0073232 A1 | 3/2008 | Reshamwala et al. |
| 2008/0073251 A1 | 3/2008 | Reshamwala et al. |
| 2008/0140032 A1 | 6/2008 | O'Malley |
| 2009/0032423 A1 | 2/2009 | Japuntich |

(Continued)

FOREIGN PATENT DOCUMENTS

| | | |
|---|---|---|
| DD | 271454 | 9/1989 |
| DE | 4319989 | 12/1994 |

(Continued)

OTHER PUBLICATIONS

Non-Final Office Action in U.S. Appl. No. 12/562,355, mailed Oct. 20, 2011, 16 pgs.

(Continued)

*Primary Examiner* — Frances Tischler
(74) *Attorney, Agent, or Firm* — Servilla Whitney LLC

(57) ABSTRACT

Methods of reclaiming plastic from infectious medical waste and manufacturing medical devices from reclaimed plastic are described. Medical devices made from plastic reclaimed from infectious medical waste are also described.

21 Claims, No Drawings

U.S. PATENT DOCUMENTS

| | | | |
|---|---|---|---|
| 2009/0068412 A1 | 3/2009 | Nahmias et al. | |
| 2009/0110654 A1* | 4/2009 | Hagemann et al. | 424/76.1 |
| 2009/0120821 A1 | 5/2009 | Japuntich et al. | |
| 2009/0145901 A1 | 6/2009 | Finnestad et al. | |
| 2009/0230008 A1 | 9/2009 | Miller et al. | |
| 2010/0041937 A1 | 2/2010 | Gonzalez | |
| 2010/0062921 A1 | 3/2010 | Veiseh | |
| 2010/0155400 A1 | 6/2010 | Finnestad et al. | |
| 2010/0282623 A1 | 11/2010 | Reshamwala | |
| 2011/0068036 A1 | 3/2011 | Ji et al. | |
| 2011/0071230 A1 | 3/2011 | Ji | |

FOREIGN PATENT DOCUMENTS

| | | |
|---|---|---|
| DE | 19726105 | 12/1998 |
| JP | 2002059082 | 2/2002 |
| WO | WO-91/01396 | 2/1991 |
| WO | WO-99/62566 | 12/1999 |
| WO | WO-00/54885 | 9/2000 |
| WO | WO-2008/039438 | 4/2008 |
| WO | WO-2008/106759 | 9/2008 |
| WO | WO-2011/035119 | 3/2011 |

OTHER PUBLICATIONS

"Red Bag Solutions: Providing the Best Solution for the Disposal of Infectious RedBag Medical Waste", Red Bag Solutions @ redbag.com, 26 pgs.

Final Office Action in U.S. Appl. No. 12/562,355, mailed Feb. 27, 2012, 8 pgs.

Machine Translation of DD 271454, 1 pgs.

PCT International Search Report in PCT/US2010/049275, mailed Apr. 11, 2011, 3 pgs.

PCT IPRP & Written Opionin in PCT/US2010/049275, mailed Mar. 29, 2012, 7 pgs.

* cited by examiner

PLASTIC RECLAIMED FROM INFECTIOUS MEDICAL WASTE AND MEDICAL DEVICES MANUFACTURED THEREFROM

CROSS-REFERENCE TO RELATED APPLICATIONS

This application is a continuation-in-part of U.S. patent application Ser. No. 12/562,355, filed on Sep. 18, 2009, the contents of which is specifically incorporated by reference herein in its entirety.

FIELD OF THE INVENTION

The present invention relates generally to methods of reclaiming and recycling plastics from comingled medical waste. More specifically, embodiments of the invention are directed to methods of reclaiming plastics from comingled infectious medical sharps waste for use in making medical devices from the reclaimed plastics and to medical devices made from the reclaimed plastics.

BACKGROUND

The disposal of medical waste is a significant concern from an environmental perspective. Medical waste, which is often infectious, is currently sterilized and relegated to many lifetimes in a landfill. Even though many components of medical waste are considered recyclable, these components are not reused for fear of contamination from the infectious materials and the stigma associated with medical waste containing infectious matter. This results in the waste of tens of millions of pounds of otherwise recyclable materials and occupies valuable space in landfills.

Medical waste can include sharps containers (both used and unused), plastics, metal, glass, syringes, rubber, paper, fabric, blood, pathogens, and other infectious materials. The medical waste components are usually comingled within a waste container. Sterilization can be carried out by a number of techniques including, but not limited to, autoclaving, gamma irradiating, exposure to ethylene oxide, exposure to microwaves, exposure to radio-frequency waves, exposure to high temperatures, and combinations of these techniques. Many of these techniques are not particularly desirable, as they can leave an unpleasant smell, traces of blood may still be seen, and the physical properties of the sterilized plastics can be altered. Therefore, the choice of sterilization technique can have an effect on the ability to reclaim and recycle the resulting sterilized material.

Recycling plastics is a fairly common practice where the plastics are from benign sources. However, plastic comingled with infectious waste typically is not recycled into useful products, especially not into medical devices. U.S. Pat. No. 5,833,922 describes a method for processing medical waste using radio-frequency electromagnetic radiation to obtain reclaimed plastic and refuse-derived fuel; however, there is no description of use of the reclaimed plastic in medical devices other than sharps disposal containers, possibly due to the limited efficacy of using radio-frequency electromagnetic sterilization to sterilize the plastics. It would be desirable to provide more efficient and efficacious methods of separating, sterilizing and reclaiming plastics from other materials commingled with infectious waste. Aside from limitations inherent in the radio-frequency electromagnetic radiation to sterilize plastics commingled and contaminated with infectious waste, there is a lack of coordinated efforts to reclaim and recycle plastics commingled with infectious waste. Thus, while recycling techniques such as the type described in U.S. Pat. No. 5,833,922 exist, it is not believed that such techniques have been used to reclaim plastic for use in medical devices. Accordingly, it would be advantageous to provide improved systems and methods for the coordination of such reclamation and recycling efforts. Therefore, there is a need to develop methods of reclaiming and recycling useable material from infectious medical waste into new medical devices.

SUMMARY

One or more embodiments of the invention are directed to methods of making a medical device through the reclamation of plastics from infectious medical waste. Plastic resins are obtained from a sterile, shredded and washed medical waste material recovered from a mixture of medical waste containers containing used medical devices in which shredding, sterilizing and washing are performed substantially simultaneously. The plastic resin is formed into a new medical device.

In a detailed embodiment, the shredding, sterilizing and washing are performed in a liquid medium. In specific embodiments, the plastic is separated from the metal, glass, rubber and high density plastic by a float-sink technique. In specific embodiments, low density plastic is obtained. In more specific embodiments, substantially only water and steam are used to shred, sterilize and wash the used medical waste.

In specific embodiments, the reclaimed plastic comprises substantially only polypropylene and polyethylene. In some detailed embodiments, the methods further comprise formulating (or reformulating) the plastic resin prior to incorporating it into new medical devices.

In one or more embodiments, substantially all of the polypropylene and polyethylene in the used medical waste container is recovered from the plastic medical waste container and its contents, the total of which may constitute about 60-70% of the waste in the medical waste container.

In some embodiments, the medical waste is treated on-site to reclaim the plastic, which can be picked up and transported for processing into new medical devices. In other embodiments, the medical waste container is transported from a medical facility to a waste treatment center. In detailed embodiments, the method further comprises scheduling routine pickup of the plastic medical waste container from the medical facility.

In specific embodiments, the new medical device formed from the reclaimed plastic is selected from the group consisting of a medical waste container, a non-fluid path medical device (e.g., plunger rod) and a fluid path medical device (e.g., barrel). In detailed embodiments, the new medical waste container is a sharps container comprising molded low density plastic, glass components and metal components.

Additional embodiments of the invention are directed to medical devices formed from plastic obtained from reclaimed plastic obtained from medical waste that has been shredded, sterilized and washed substantially simultaneously. The plastic being reclaimed from comingled infectious medical waste selected from the group consisting of rubber, mixed plastics, metal, glass and combinations thereof and other medical waste.

In detailed embodiments, the used medical waste comprises a sharps container containing plastic and one or more of glass and metal.

Further embodiments of the invention are directed to methods of recycling used medical waste material. Supply of medical waste containers to a medical facility is coordinated. Collection of used medical waste containers from the medical facility is coordinated. Reclamation of plastics from the used medical waste containers is coordinated. Manufacture of medical devices from the reclaimed plastic is coordinated. Supply of the medical devices to the medical facility is coordinated. In specific embodiments, the used medical waste containers contain infectious waste.

In detailed embodiments, the medical devices can be made from recycled plastic at a lower cost than medical devices manufactured from virgin plastics, and each of the coordinating steps are performed by a single entity.

In specific embodiments, recycling of plastics from the used medical waste containers and their contents comprises a technique which substantially simultaneously shreds, sterilizes and washes the waste. In more specific embodiments, recycling of plastics from the used medical waste containers and their contents comprises separating plastics from the shredded waste using a float-sink technique.

In further specific embodiments, an enhanced recycling process with improved effectiveness and efficiency is provided. According to one or more embodiments, the enhanced process begins with sharps medical containers containing medical waste and can include segregation processes, grinding processes, screening processes, metal separation processes, color separation processes, and polymer separation processes and devolatilization processes, in one or more various combinations, to provide reclaimed plastic. The reclaimed plastic preferably meets or exceeds industry standards concerning hazardous materials. A preferred medical device made from such enhanced processes is a medical waste container containing less than 100 ppm heavy metal, with little to no materials of concern.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

As used in this specification and the appended claims, the term "medical device" refers to any medical device, including, but not limited to, medical waste containers, non-fluid path devices and fluid path devices. Suitable medical devices include, but are not limited to, medical waste containers (e.g., sharps medical containers, pharmaceutical waste containers, RCRA containers and chemotherapy containers), hypodermic syringes, catheters, flush syringes, urine cups, plastic tubes, pour bottles and sterilization wraps. Fluid path medical devices include hypodermic syringes, catheters, flush syringes, plastic tubes, and fluid collection tubes, and specifically exclude sharps waste containers.

As used in this specification and the appended claims, the term "medical waste" refers to comingled medical waste including, but not limited to, one or more of plastic, molded plastic components, rubber, glass, metal, paper, fabric and blood. Examples of medical waste include, but are not limited to, used sharps containers which contain plastic and one or more of glass, metal, rubber.

As used in this specification and the appended claims, the term "coordinating" means planning and directing specified activities, either by conducting the activities directly, or by directing specific activities to be conducted by others. Coordinating may include, but is not limited to, conducting, causing to happen, placing an order for, purchasing, receiving an order for, selling and the like. For example, coordinating collection of medical waste containers can include, but is not limited to, picking up the medical waste containers personally, sending an employee to pick up the waste containers and asking an employee of a separate company to pick up the waste containers. In one or more embodiments, the coordinating may be conducted by a single entity, for example, a medical device manufacturer and/or supplier. Thus, the medical device supplier/manufacturer is a central entity in a recycling scheme as described further below.

As used in this specification and the appended claims, "reclamation", "reclaim" and "reclaiming" refer to the recovery of useful substances from waste products. A specific example of a reclamation process involves the recovery of usable plastic material from a mixture of plastic waste mixed with contaminated infectious medical waste. As used in this specification and the appended claims, "recycle" or "recycling" means the act of processing used or waste materials for use in creating new products. As will be understood from a reading of the specification, a recycling operation that recycles used plastic devices will involve reclamation of plastic material from the used plastic devices and creating new products from the reclaimed plastics.

One or more embodiments of the invention are directed to methods of making medical devices from recycled plastic. The methods comprise obtaining plastic resin from sterilized medical waste material reclaimed from a mixture of plastic medical waste containers containing medical waste. The plastic resin is formed into recycled medical devices.

In detailed embodiments, the sterile shredded plastic medical waste material is shredded, sterilized and washed substantially simultaneously, preferably in a liquid medium thereby enhancing the efficiency and efficacy of the operation. Suitable techniques for shredding and sterilizing include, but are not limited to, techniques employed by Red Bag Solutions, Baltimore, Md. (www.redbag.com), including their Steam Sterilizer Macerator ("SSM") process. Briefly, the SSM process seals infectious waste in a tank. Steam and superheated water are added to the tank. The waste is soaked and a pump grinder draws the waste through a cutter and pump impeller to shred the material. This shredding may also be referred to "maceration." The shredded material is returned to the tank and continually cut into smaller pieces while circulating through the system. Once the waste is thoroughly shredded, the waste stream is heated to, and held at, about 272° F. for about six minutes. Cold water is then injected into the system to cool the waste which is discharged into a filter to separate the solid from liquid waste. For more information on the Red Bag Solutions process, see www.redbag.com/site/Corp/how.htm and Gilpen, "Superheated Water and Steam Sterilization and Grinding of Hospital and Laboratory Waste," available at www.redbag.com/Site/Documents/SSMGilpinPaper0011.pdf.

As used herein, "sterilization" is intended to cover any process that effectively kills or eliminates transmissible agents (such as fungi, bacteria, viruses, spore forms, etc.) from a surface, equipment, article of food or medication, or biological culture medium. As such, the term covers processes in which one or more transmissible agents are completely killed, as well as processes in which the levels of one or more transmissible agents are reduced compared to pretreatment levels. In preferred embodiments, the kill rate for one or more transmissible agents is $10^6$, more preferably $10^{12}$. For example, using the SSM process from Red Bag Solutions, kill rates of $10^6$ may be achieved by heating at 250° C. for 15 minutes, whereas kill rates of $10^{12}$ may be achieved by heating at 250° C. for 30 minutes (known as "overkill")

Equivalent times at temperatures above and below 250° C. may be determined as in Gilpen, "Superheated Water and Steam Sterilization and Grinding of Hospital and Laboratory Waste," available at www.redbag.com/Site/Documents/SSMGilpinPaper0011.pdf. The term "sterilization" is also intended to cover processes that disinfect or sanitize medical waste.

In a specific embodiment, the medical waste containers containing the medical waste are sterilized using substantially only liquid water and steam. A particular benefit of this process prevents the addition of undesirable chemicals to the waste. In addition, a system that uses liquid water and steam is odorless, results in minimal to no degradation of the plastic material, and enables shredding, sterilization and washing to be performed substantially simultaneously. The substantially simultaneously shredded, sterilized and washed material is essentially free of offensive odors or visible signs of blood.

The shredded, sterilized and washed waste is a combination of the medical waste container and the contents of the container. The plastic portion of the shredded, sterilized and washed waste is generally in a form referred to as flakes. The plastic must be reclaimed from this mixture before it can be recycled. In a specific embodiment, the plastic is reclaimed from the metal and/or glass, or other components, by float-sink techniques. In float-sink separation, the waste is placed into a bath having known specific gravity. The waste material with a lower specific gravity than the bath will float, while material with a greater specific gravity will sink. For example, the shredded sterilized waste may be placed into a bath having a specific gravity greater than that of polypropylene. This will result in the polypropylene, and polyethylene, which has lower specific gravity, to float to the surface of the bath. The glass, metal and other plastics may sink to the bottom. The specific gravity of the bath can be altered with various additives to selectively separate various plastic species from the shredded sterilized waste. One particular advantage to simultaneous shredding and sterilization is that the waste would otherwise need to be shredded before sterilization, resulting in contamination of the shredding equipment. Additionally, when using the SSM process from Red Bag Solutions, the simultaneous shredding and sterilization process does not require separate washing processes or an elutriator.

In detailed embodiments, the reclaimed plastic comprises substantially only polypropylene and polyethylene. The composition of the plastic will be dependent on the medical waste being sterilized. Each batch of medical waste that is sterilized and separated can have a different polypropylene/polyethylene ratio. This ratio may need to be adjusted, depending on the specifications of the product to be manufactured. In specific embodiments, the plastic obtained from the recycled medical waste may be reformulated to control the physical properties of the material.

In detailed embodiments, substantially all of the polypropylene and polyethylene in the used medical waste container is recovered from the plastic medical waste container, which may constitute about 60-70% of the waste in the medical waste container. By "substantially all" is meant preferably greater than 75%, 80%, 85%, 90%, 95%, 99% and 99.9%. In detailed embodiments, the medical waste is treated on-site to reclaim the plastic, which can be picked up and transported for processing into new medical devices. In other embodiments, the medical waste container is transported from a medical facility to a waste treatment center. In detailed embodiments, the method further comprises scheduling routine pickup or shipping of the plastic medical waste container from the medical facility to the waste treatment center for treatment, then to a recycler.

Additional embodiments of the invention are directed to medical devices formed from plastic obtained from shredded, sterilized and washed medical waste separated from comingled infectious medical waste, which may include rubber, mixed plastics, metal, glass, paper, fabric, blood and combinations thereof. In specific embodiments, the plastic is separated from a composite of plastic and one or more of glass and metal. In detailed embodiments, the used medical waste from which plastic is reclaimed is a sharps container and its contents comprising plastic and containing one or more of glass and metal.

A specific embodiment of an enhanced recycling process will now be provided. It should be noted, however, that the steps provided in the process may be performed in different orders, and some steps may be omitted entirely, depending upon the level of purity desired and processing economics. Although given in reference to a sharps (red) medical container, into which used medical needles, I.V. catheters, and other sharp medical instruments are deposited, the process is not intended to be so limited, and may be applied to other medical devices.

In one embodiment of an enhanced process, the medical sharps container is segregated, if needed, from other infectious medical waste, such as chemotherapy (yellow) containers and pharmaceutical waste containers (blue and white), prior to grinding, shredding, sterilizing and washing the medical sharps container using, e.g., a maceration process such as the Red Bag Solutions SSM process described above. In a further embodiment, the contents of the sharps medical container can be removed prior to the maceration process.

Following grinding, shredding and sterilization of the sharps containers, the flakes can be further ground to a finer size, such as, e.g., about ¾ or ⅜ inch flakes. This can be done in a suitable grinder in conjunction with, e.g., box dumper/surge bin with auger feeder. It will be understood that the flake size is exemplary and not limiting of the invention.

The ground flakes can then be sorted through an appropriate separation apparatus, for example, a vibratory screen separator. Oversized and under sized flakes are removed, and can be further separated into their component parts if desired. For example, undersized flakes may contain metal, glass, rubber and heavy plastics that can be separated out and reprocessed if desired, or simply scrapped.

The desired screen-sorted flakes can then be fed into an air classifier, which further sorts the flakes on the basis of size, shape and density, in particular removing dust, dirt, paper, fabric, etc.

The desired air-classified flakes can then be subjected to the float sink separation process described above (or an equivalent dry separation process), which separates the materials on the basis of specific density. In this way, the desired polymer resin flakes can be collected, and remaining metal, glass, rubber and high density plastics can be separated out and reprocessed if desired, or simply scrapped.

The desired float sink-separated polymer resin flakes can then be dried and refed into an air classifier. The desired air-reclassified flakes can then be subjected to any number of separation processes to further purify the polymer resin flakes. For example, the polymer resin flakes can be fed sequentially into a metal separator (e.g., ferrous and/or non-ferrous), to remove any remaining metal contaminants, a color separator (e.g., optical, NIR spectroscopy, laser spectroscopy), to remove colored contaminants, and a polymer separator (e.g., X-ray, fluorescence, NIR spectroscopy, laser spectroscopy), to remove unwanted polymer flakes. In this specific example, polypropylene flakes are retained, and any polyethylene, polyurethane and polyisoprene flakes are discarded. Of course, the contaminants removed at each step can be reprocessed if desired, or simply scrapped.

The desired resin flakes can then be placed into a devolatilizing chamber for devolatilization, and then passed through a sensory analyzer for pass/fail analysis. Material that fails can be reprocessed or simply scrapped. The material which passes, which constitutes the reclaimed plastic, can then be blended with additional well-known ingredients (e.g., other resins, nucleating agents, anti-static agents, anti-oxidants, stabilizers, etc.) and extruded and pelletized into pellets. In one actual run with sharps medical containers filled with medical waste, over 60% of the total plastic in the containers and the medical waste was reclaimed into pellets.

The pellets comprising the reclaimed plastic can be injection molded into new medical devices, such as, for example medical sharps container, chemotherapy containers and pharmaceutical waste containers. Non-fluid path medical devices, such as syringe plungers, can also be formed. The reclaimed plastic may be subjected to one or more laboratory tests for safety, if desired.

Some or all of the steps described above can be controlled by an operator control system, examples of which are known in the art.

The new medical devices made from the reclaimed plastic are safe to handle by human hands. For example, in one actual run with sharps medical containers filled with medical waste, the reclaimed plastic contained 3 ppm heavy metal, significantly less than the maximum allowed limit of 100 ppm. In addition, little to no materials of concern were present. In this way, the stigma of both hazardous material and smell associated with reusing medical sharps waste containers was removed.

Further embodiments of the invention are directed to methods of recycling used medical material. These methods also protect the environment and divert waste material from the landfills. The methods comprise coordinating supply of medical sharps waste containers to a medical facility; coordinating collection of used medical sharps waste containers from the medical facility; coordinating recycling of plastics from the used medical waste containers; coordinating manufacture of medical devices from the recycled plastic; and coordinating supply of the medical devices to the medical facility.

In one aspect of the invention, a single entity coordinates, that is orchestrates or directs, the reclamation and recycling effort. In a specific embodiment, the single entity is a medical device manufacturer or medical device supplier. The medical device manufacturer or supplier coordinates the various activities that comprise the reclamation and recycling scheme, as described further below.

In a specific embodiment, an entity coordinates the supply of medical waste containers to a medical facility such as a hospital, clinic, university, doctor's office or other facility that utilizes medical waste containers. After the medical waste containers are used or filled with medical waste including infectious waste, they can be disposed of in a manner that facilitates their collection for recycling efforts. One step in the recycling scheme involves coordinating collection of used medical sharps waste containers from the medical facility, which can be achieved in a variety of ways. This includes, but is not limited to, an entity itself picking up the containers, for example, having an employee pick up the containers, or by directing or requesting a third party to pick up the medical waste containers, including paying the third party to do so.

Another step in the scheme involves coordinating the reclamation of plastics from the used medical sharps waste containers to provide reclaimed plastic. This can be achieved by having the entity that collects the used waste containers deliver them to a facility that handles reclamation and/or recycling of mixed waste such as mixed medical waste. It will be appreciated that it may be desirable and cost efficient for the coordinating entity or coordinator to set up a reclamation or recycling operation very close to or adjacent the medical facility to shorten delivery time and costs. In some instances in which the reclamation process for reclaiming and sterilizing the plastic is relatively clean and odor free, it may be possible to perform the reclamation operation within the medical facility, for example, in a separate wing of the medical facility or in the basement. Alternatively, the reclamation effort can be coordinated to occur close to, adjacent or within the manufacturing plant where the reclaimed plastic will be utilized to manufacture recycled medical devices. Of course, neither or these scenarios are necessary to the operation, but may be desired to enhance the efficiency and cost of the overall scheme. The reclaimed material can be in any suitable form such as shredded plastic, plastic chips, plastic pellets, plastic flakes, etc.

The reclaimed plastic material is used to make new medical devices with recycled content. The medical device manufacturer or supplier can coordinate the manufacture of medical devices in a variety of ways. For example, the manufacturer may have the reclaimed plastic shipped to one of its facilities to be used in a medical device manufacturing process. The reclaimed plastic may be used to make a device that is comprised in its entirety of the reclaimed plastic, or a portion of reclaimed plastic, depending on the specification of the medical device. In another embodiment, coordinating may involve directing the reclaimed plastic to a third party for use in the manufacture of a medical device. Again, the new medical device made can be made entirely of the reclaimed plastic, or a fraction of the material that makes up the medical device may be reclaimed plastic. Alternatively, the reclaimed plastic can be sold to a buyer for use in both medical and/or non-medical applications where plastics are desired.

The manufactured medical devices are then supplied to a medical facility. Preferably, this is a coordinated supply activity, which may be performed by the single entity, for example, the medical device manufacturer or supplier. Thus, coordinating supply of the medical devices to the medical facility includes, but is not limited to, selling or giving the devices to the medical facility personally, or asking/paying a different person or company to do so.

Thus, the above described scheme provides for a coordinated and comprehensive way of ensuring that plastic within medical waste is reclaimed, recycled into new products and supplied to medical facilities. The scheme according to one embodiment is facilitated by coordination by a single entity.

In detailed embodiments, the medical devices are provided at a lower price than medical devices manufactured from virgin plastics.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method of making a medical device comprising:
   providing one or more medical sharps containers containing medical waste;
   sterilizing, shredding and washing the medical sharps container or containers and their contents to provide shredded, sterilized and washed flakes, sterilizing, shredding and washing being performed simultaneously with one or more of water and steam;
   extruding and pelletizing the shredded, sterilized and washed flakes into pellets; and
   forming the pellets into a medical device.

2. The method of claim 1, wherein the medical device is a medical waste container.

3. The method of claim 1, wherein the medical waste is removed from the one or more sharps medical containers prior to sterilizing, shredding and washing.

4. The method of claim 1, wherein the one or more medical sharps containers containing medical waste are segregated from chemotherapy containers and/or pharmaceutical waste containers prior to sterilizing, shredding and washing.

5. The method of claim 1, wherein the medical sharps container or containers and their contents are sterilized at a temperature of at least about 250° C. for at least about 15 minutes.

6. The method of claim 1, wherein the shredded, sterilized and washed flakes are subjected to one or more additional processes prior to extrusion and pelletization.

7. The method of claim 6, wherein the shredded, sterilized and washed flakes are further ground prior to extrusion and pelletization.

8. The method of claim 6, wherein the shredded, sterilized and washed flakes are screen-sorted prior to extrusion and pelletization.

9. The method of claim 6, wherein the shredded, sterilized and washed flakes are fed into an air classifier prior to extrusion and pelletization.

10. The method of claim 6, wherein the shredded, sterilized and washed flakes are float sink-separated prior to extrusion and pelletization.

11. The method of claim 10, wherein the shredded, sterilized and washed flakes are separated from material comprising metal, glass, rubber and/or heavy plastics.

12. The method of claim 6, wherein the shredded, sterilized and washed flakes are subjected to a metal separation process prior to extrusion and pelletization.

13. The method of claim 6, wherein the shredded, sterilized and washed flakes are subjected to a color separation process prior to extrusion and pelletization.

14. The method of claim 6, wherein the shredded, sterilized and washed flakes are subjected to a polymer separation process prior to extrusion and pelletization.

15. The method of claim 14, wherein the separation process comprises spectroscopy.

16. The method of claim 15, wherein the pellets formed into the medical device consist essentially of polypropylene.

17. The method of claim 6, wherein the shredded, sterilized and washed flakes are devolatilized prior to extrusion and pelletization.

18. The method of claim 1, wherein the shredded, sterilized and washed flakes are mixed with one or more additives prior to extrusion and pelletization.

19. The method of claim 18, wherein the one or more additives include resins, nucleating agents, anti-static agents, antioxidants and/or stabilizers.

20. A method of reclaiming plastic from infectious medical waste, comprising:
   providing one or more medical sharps containers containing infectious medical waste;
   simultaneously shredding, sterilizing, and washing the medical waste container or containers with one or more of water and steam to provide shredded, sterilized and washed plastic flakes;
   further grinding the shredded, sterilized and washed plastic flakes;
   float sink-separating the further ground flakes; and
   subjecting the float sink-separated flakes to one or more spectroscopy-based separating processes to obtain reclaimed plastic.

21. The method of claim 20, wherein substantially all of the plastic in the containers and the medical waste is reclaimed.

* * * * *